T. LABREE.
Potato Cutter and Dropper.
No. 218,281.  Patented Aug. 5, 1879.
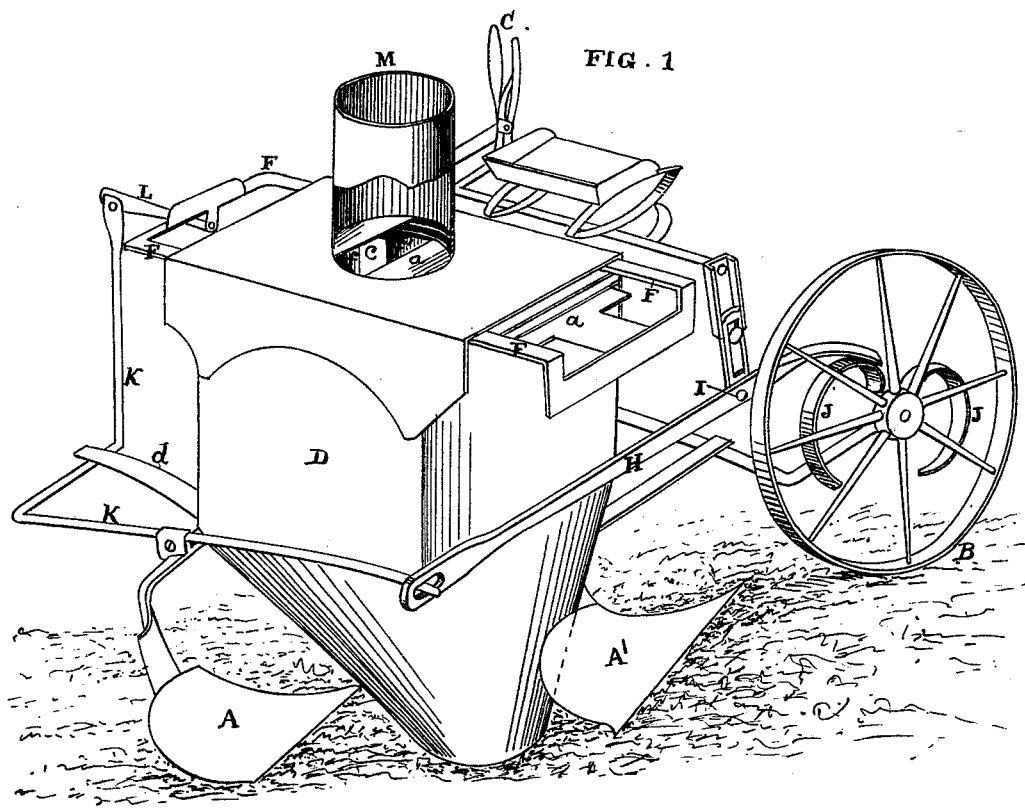
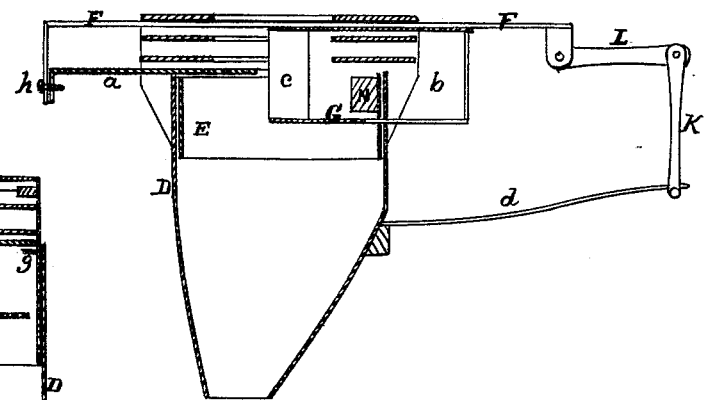
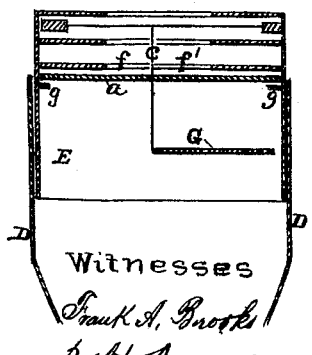
Witnesses
Frank A. Brooks
D. H. Nourse
Inventor
Thomas Labree
By Dewey & Co.
Attys

UNITED STATES PATENT OFFICE.

THOMAS LABREE, OF CASTROVILLE, CALIFORNIA, ASSIGNOR OF ONE-HALF HIS RIGHT TO FRANK KOPMAN, OF SAME PLACE.

IMPROVEMENT IN POTATO CUTTER AND DROPPER.

Specification forming part of Letters Patent No. 218,281, dated August 5, 1879; application filed May 22, 1879.

*To all whom it may concern:*

Be it known that I, THOMAS LABREE, of Castroville, county of Monterey, and State of California, have invented a Potato Cutter and Dropper; and I hereby declare the following to be a full, clear, and exact description thereof.

My invention relates to an improvement in potato cutters and droppers; and my improvements consist in providing a case or box, which may be mounted on the beams of a gang or sulky plow, said box carrying a cutting-knife, which is operated by a lever moved by cams on the wheels, so that the potato is cut into two pieces, and one piece dropped at a time into the furrow behind the first plow, so as to be covered by the second one.

My invention further relates to an improved feed-tube and a regulatable false bottom, by which the potatoes are held to the center of the knife and the sizes of the pieces to be cut regulated; and, also, to certain details of construction, whereby the device is rendered very efficient for the purpose for which it is intended, as is fully illustrated in the accompanying drawings, in which—

Figure 1 is a perspective view. Figs. 2 and 3 are vertical sections.

The potato cutter and dropper is intended as an attachment to a sulky or gang plow, and is mounted on the beams carrying the plows A A', attached to the axle, which is supported on the wheels B. The axle is provided with the usual lever C for raising or lowering it, so as to regulate the cut of the plows, and a seat is provided for the driver, as shown. Between the beams is mounted a hopper, D, the lower or smaller end of which opens immediately behind the first plow, so that the potatoes are dropped into the furrow, and the following or second plow covers them. On top of this is a box, E, which carries the cutting mechanism, detainer, &c., as hereinafter described. This box is so constructed as to form guides for the sliding frame F, which carries the sliding bottom $a$, plate $b$, and knife $c$, as shown. The plate $b$, which carries the knife $c$, is on the upper part of the frame, and the movable bottom is on the opposite end of the frame, and lower down, both moving with or forming part of the frame. The knife $c$ forms part of the detaining-box G, which slides back and forth in the box E, as hereinafter described.

A reciprocating motion is imparted to the frame by means of a lever, H, which is pivoted on a movable fulcrum, I, and is operated by the cams J on the wheel of the sulky or gang plow. The outer end of this lever is connected with a right-angled rod, K, which is again connected by an arm, L, to the sliding frame F, as shown. When the end of the lever is lifted by the cam on the wheel, the frame, with the knife $c$, plate $b$, and false bottom $a$, is drawn forward, and when it is released by the cam a spring, $d$, on the right-angled rod K draws the frame back again to its former position.

On top of the box E is placed a tube, M, through which the potatoes are fed to the knife. These tubes are intended to be made of different sizes, according to the general size of the potatoes being used as seed. In this way the potato may be fed to the center of the knife exactly, smaller tubes being used where small potatoes are being cut for seed. As the potato falls through this tube it rests on the false sliding bottom $a$. As the cam-lever and rod throw the sliding frame forward, the vertical knife $c$ cuts it in two, and at the same time the plate $b$, to which the knife is attached, shuts off communication between the tube and box. The knife is at the center of the plate, and as the potato is divided in two parts, one half falls through the spaces $f f'$ on each side of said knife, the false bottom being lower than the plate, so as to form said spaces. These pieces do not fall through until the false sliding bottom has been drawn forward by the frame until there is no longer support for them. One of the pieces falls through the space $f$, and is directed by the hopper into the furrow behind the first plow, being covered by the second plow. The other half of the divided potato falls through the space $f'$, and is caught in the detainer G and not allowed to drop into the hopper.

As the lever drops off the cam, the spring $d$ draws the sliding frame back, and with it draws back the detainer G. As this detainer G is drawn back, a block or lug, N, pushes the piece of potato which was in the detainer out into the hopper, which leads it to the furrow, where it is covered, as was the other piece. One piece falls, therefore, at each forward and one at each backward motion of the frame; but the cutting is only done at the forward motion. This does away with the necessity of double knives, and prevents more than one piece, by any accident, being dropped to the furrow at one time. The method of cutting and dropping also insures regularity of sizes and distances between hills, with no danger of any waste.

The false bottom $a$ slides in guides $g$, and is attached to the frame by means of a set-screw, $h$. It may be taken out and set higher in the guides $g$, and the set-screw put in place again. By thus raising or lowering the false bottom, the size of the openings $f f'$ are regulated so that only certain-sized pieces of potato may be dropped to the hopper.

The fulcrum I of the lever is provided with a set-screw, so it may be raised in going to or from a field, so the knife may be thrown out of operation. The spring $d$ then keeps the frame back so the false bottom will be under the tube, and no potatoes will be dropped, even if the tube is full. By raising or lowering the fulcrum, the cut of the knife may be regulated by regulating the stroke of the lever.

The potatoes are thus fed to the feed-box regularly, according to size, and divided into pieces of equal dimensions, and the construction of the device is such that the sizes may be regulated to suit circumstances. The pieces are dropped about two feet apart.

This device renders it unnecessary to cut potatoes by hand for seed, and does away with the hard work of following, carrying, and dropping after the plow, when a good many get tramped in by the horses or get mashed by the wheels. It also saves the labor of several men.

Having thus described my invention, what I claim as new, and desire to secure by Letters Patent, is—

1. In a potato cutter and dropper, the combination and arrangement of the case or box E, provided with the sliding frame F, plate $b$, vertical knife $c$, and false bottom $a$, and having the removable tubes M and detainer G, with the stop N and the hopper D, substantially as and for the purpose herein described.

2. The box E, with its sliding frame F, carrying the regulatable false bottom $a$, plate $b$, and knife $c$, and having the detainer G, with its stop N and the removable tubes M, and hopper D, said frame being provided with the operating mechanism, consisting of the lever H, rod K, arm L, and spring $d$, in combination with the wheels B, provided with the cams J, and supporting the plows A A', substantially as and for the purpose herein described.

3. The false bottom $a$, fitted to be raised or lowered on the sliding frame F in the guides $g g'$, in combination with the knife $c$ and sliding plate or top $b$, whereby the openings $f f'$, leading to the hopper D, may be enlarged or decreased, so as to increase or diminish the size of the seed-pieces, substantially as herein described.

In witness whereof I have hereunto set my hand.

THOMAS LABREE.

Witnesses:
   T. WOODS,
   F. KOPMAN.